United States Patent
Patrylak

(10) Patent No.: US 12,054,315 B2
(45) Date of Patent: *Aug. 6, 2024

(54) CAP LINER COMPRISING A SINTERED FLUOROPOLYMER LAYER

(71) Applicant: ROGERS CORPORATION, Chandler, AZ (US)

(72) Inventor: R. Ray Patrylak, Brooklyn, CT (US)

(73) Assignee: ROGERS CORPORATION, Chandler, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/203,722

(22) Filed: May 31, 2023

(65) Prior Publication Data

US 2023/0303292 A1      Sep. 28, 2023

Related U.S. Application Data

(63) Continuation of application No. 16/800,528, filed on Feb. 25, 2020, now Pat. No. 11,708,196.

(60) Provisional application No. 62/812,438, filed on Mar. 1, 2019.

(51) Int. Cl.
| | |
|---|---|
| *B65D 41/04* | (2006.01) |
| *B32B 27/06* | (2006.01) |
| *B32B 27/32* | (2006.01) |
| *B65D 53/06* | (2006.01) |

(52) U.S. Cl.
CPC ........ *B65D 41/0435* (2013.01); *B32B 27/065* (2013.01); *B32B 27/322* (2013.01); *B65D 53/06* (2013.01); *B32B 2266/025* (2013.01); *B32B 2305/026* (2013.01); *B32B 2305/80* (2013.01);

(Continued)

(58) Field of Classification Search
CPC ........ B32B 2250/24; B32B 2266/0214; B32B 2266/025; B32B 2274/00; B32B 2305/026; B32B 2305/80; B32B 2307/4026; B32B 2307/71; B32B 2307/712; B32B 2307/714; B32B 2307/7242; B32B 2307/732; B32B 2435/00; B32B 2435/02; B32B 27/065; B32B 27/08; B32B 27/16; B32B 27/20; B32B 27/281; B32B 27/285; B32B 27/286; B32B 27/302; B32B 27/304; B32B 27/306; B32B 27/308; B32B 27/32; B32B 27/322; B32B 27/34; B32B 27/36; B32B 27/365; B32B 27/38; B32B 27/40; B32B 27/42; B32B 5/18; B65D 2251/20; B65D 41/0435; B65D 53/06
See application file for complete search history.

(56) References Cited

U.S. PATENT DOCUMENTS

| | | | |
|---|---|---|---|
| 3,946,136 A | 3/1976 | Fitz et al. | |
| 4,547,424 A | 10/1985 | Suzuki | |
| 5,674,609 A | 10/1997 | Sprague | |

(Continued)

*Primary Examiner* — Hai Vo
(74) *Attorney, Agent, or Firm* — CANTOR COLBURN LLP

(57) ABSTRACT

In an aspect, a cap liner comprises a sintered fluoropolymer layer; and a backing layer; wherein the sintered fluoropolymer layer is in direct physical contact with the backing layer with no intervening layer located there between. In another aspect, a method of forming the cap liner of comprises plasma etching the sintered fluoropolymer layer to form a sintered plasma etched layer; and laminating the sintered plasma etched layer and the backing layer to form the cap liner.

18 Claims, 1 Drawing Sheet

(52) U.S. Cl.
CPC ...... *B32B 2435/00* (2013.01); *B65D 2251/20* (2013.01)

(56) References Cited

U.S. PATENT DOCUMENTS

| | | | |
|---|---|---|---|
| 7,461,754 | B2 | 12/2008 | Walsh |
| 9,605,760 | B2 * | 3/2017 | Mishra .................. F16J 15/108 |
| 2004/0115418 | A1 * | 6/2004 | Anderson ............. B29C 48/022 |
| | | | 428/308.4 |
| 2004/0121677 | A1 | 6/2004 | Jahn et al. |
| 2005/0248097 | A1 | 11/2005 | Walsh |
| 2006/0281864 | A1 | 12/2006 | Nelson |
| 2009/0200308 | A1 | 8/2009 | Walsh |
| 2009/0230078 | A1 | 9/2009 | Walsh |
| 2012/0067883 | A1 | 3/2012 | Montuori et al. |
| 2014/0099461 | A1 | 10/2014 | Swanick |

\* cited by examiner

CAP LINER COMPRISING A SINTERED FLUOROPOLYMER LAYER

CROSS-REFERENCE TO RELATED APPLICATION

This application is a continuation of U.S. application Ser. No. 16/800,528 filed Feb. 25, 2020, which claims the benefit of U.S. Provisional Patent Application Ser. No. 62/812,438 filed Mar. 1, 2019. The related applications are incorporated herein in their entirety by reference.

BACKGROUND

Capped containers can be used to store various components therein. Cap liners are often used in the hopes of forming a seal between the cap and the container that is sufficient to prevent transfer of components out of or into the container. Often though, these liners suffer from insufficient compression set values resulting in a loss of resiliency with time. This loss can disadvantageously result in leakage of the internal components out of the container or gas exchange from the atmosphere into and out of the container. Additional considerations of liner design include the fact that the liners can come in contact with the contents of the container. It can therefore be important that the liner is impervious to the contents of the container and does not interfere with the nature of the container contents in any way. Therefore, the mechanical integrity of the liner with multiple openings and closings of the capped container should be high enough to avoid shredding or tearing of the liner and possible contamination of the internal components with the liner material.

A liner that overcomes one or more of these drawbacks is desired.

BRIEF SUMMARY

Disclosed herein is a cap liner and a method of making the same.

In an aspect, a cap liner, comprises a sintered fluoropolymer layer; and a backing layer; wherein the sintered fluoropolymer layer is in direct physical contact with the backing layer with no intervening layer located there between.

In another aspect, a method of forming a cap liner comprises plasma etching the sintered fluoropolymer layer to form a sintered plasma etched layer; and laminating the sintered plasma etched layer and the backing layer to form the cap liner.

The above described and other features are exemplified by the following figures, detailed description, and claims.

BRIEF DESCRIPTION OF THE DRAWINGS

The figures are exemplary embodiments, wherein the like elements are numbered alike.

DETAILED DESCRIPTION

Figure 1:
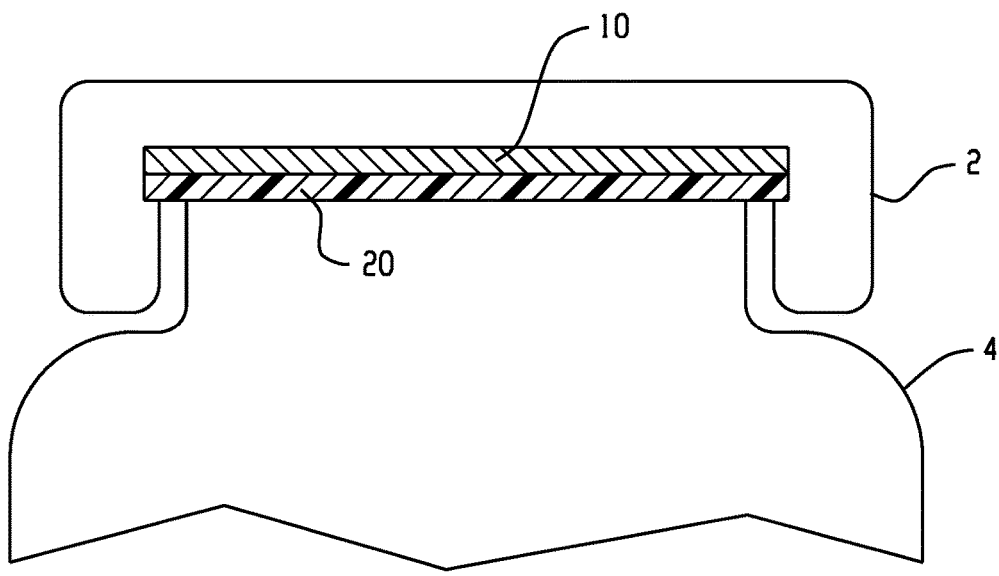
FIG. 1 is an illustration of an aspect of a portion of a container comprising a cap liner.

The trend in cap liners has been increasingly moving towards cleaner, more pure products. The Food and Drug Administration (FDA) and other agencies have approved a few polymer materials as being acceptable for coming in contact with food or medication, where several fluoropolymers are on one or more of these approved lists. Fluoropolymers in general though are non-reacting polymers that have non-stick surfaces rendering them as unsuitable for laminating processes, making it nearly impossible to laminate a fluoropolymer layer to a backing layer. In terms of cap liners, a backing layer for the fluoropolymer is important to the success of the cap liner as fluoropolymer layers alone generally do not have sufficient compression set or good conformability with repeated use. Although an adhesive layer could theoretically be used to adhere the fluoropolymer layer to a backing layer, the presence of an adhesive layer would almost unavoidably expose the contents of the container to contaminants and can disadvantageously interfere with the coefficient of thermal expansion of the cap liner.

It was discovered that a cap liner, comprising a sintered fluoropolymer layer in direct physical contact with a backing layer with no intervening layer located there between could be formed to result in a cap liner having excellent adhesion between the sintered fluoropolymer layer and the backing layer. The backing layer can be the cap-side layer of the cap liner and the sintered fluoropolymer layer can be the container-side layer that is in contact with the container and any contents thereof. The sintered fluoropolymer layer can form a fluid-tight seal against a surface of the container. The backing layer can be a foam that, when compressed, can exert a force on the sintered fluoropolymer layer, helping to maintain the fluid-tight seal with the container. After the cap is removed, the backing can return to its original shape, thereby maintaining the integrity of the cap liner.

It was discovered that the cap liner could be formed by plasma etching the sintered fluoropolymer layer to form a sintered plasma etched layer and laminating the sintered plasma etched layer and the backing layer to form the cap liner. The plasma etching can strip away exposed fluorine molecules, forming free radicals on the etched surface that can react with the backing layer, thereby forming a good adhesion between the layers. It is importantly noted that the plasma etched surface of the sintered fluoropolymer layer can be free of residual atoms from the plasma. This result is in stark contrast to an etched surface of a fluoropolymer layer that is etched via a chemical etchant such as sodium naphthalene or sodium ammonia as these etchants commonly result in a residue being present on chemically etched surfaces. A further advantage of the plasma etching as compared to a chemically etched sintered fluoropolymer layer is that the plasma etched, sintered fluoropolymer does not experience discoloration or yellowing. In other words, the cap liner after forming can maintain the desirable white color of the sintered fluoropolymer.

Fluoropolymers as used herein include homopolymers and copolymers that comprise repeat units derived from a fluorinated alpha-olefin monomer, i.e., an alpha-olefin monomer that includes at least one fluorine atom substituent, and optionally, a non-fluorinated, ethylenically unsaturated monomer reactive with the fluorinated alpha-olefin monomer. Exemplary fluorinated alpha-olefin monomers include $CF_2=CF_2$, $CHF=CF_2$, $CH_2=CF_2$, $CHCl=CHF$, $CClF=CF_2$, $CCl_2=CF_2$, $CClF=CClF$, $CHF=CCl_2$, $CH_2=CClF$, $CCl_2=CClF$, $CF_3CF=CF_2$, $CF_3CF=CHF$, $CF_3CH=CF_2$, $CF_3CH=CH_2$, $CHF_2CH=CHF$, or $CF_3CH=CH_2$, or perfluoro($C_{2-8}$ alkyl)vinylethers such as perfluoromethyl vinyl ether, perfluoropropyl vinyl ether, or perfluorooctylvinyl ether. The fluorinated alpha-olefin monomer can comprise at least one of tetrafluoroethylene ($CF_2=CF_2$), chlorotrifluoroethylene ($CClF=CF_2$), (perfluorobutyl)ethylene, vinylidene fluoride ($CH_2=CF_2$), or hexafluoropropylene ($CF_2=CFCF_3$). Exemplary non-fluorinated monoethylenically unsaturated monomers include ethylene, propylene, butene, or ethylenically unsaturated aromatic monomers such as styrene and alpha-methyl-styrene.

The sintered fluoropolymer layer can comprise at least one of poly(tetrafluoroethylene) (PTFE), poly(chlorotrifluoroethylene) (PCTFE), poly(chlorotrifluoroethylene-propylene), poly(ethylene-tetrafluoroethylene) (ETFC), poly(ethylene-chlorotrifluoroethylene) (ECTFE), poly(hexafluoropropylene), poly(tetrafluoroethylene-ethylenepropylene), poly(tetrafluoroethylene-hexafluoropropylene) (FEP), poly(tetrafluoroethylene-propylene) (FEPM), poly(tetrafluoroethylene-perfluoropropylene vinyl ether), a perfluoroalkoxy polymer (PFA), polyvinylfluoride (PVF), polyvinylidene fluoride (PVDF), or poly(vinylidene fluoride-chlorotrifluoroethylene). The sintered fluoropolymer can comprise at least one of poly(tetrafluoroethylene) or poly(vinylidene fluoride). The sintered fluoropolymer can comprise poly(tetrafluoroethylene).

The sintered fluoropolymer can comprise poly(tetrafluoroethylene), for example, a modified poly(tetrafluoroethylene). The modified poly(tetrafluoroethylene) comprises fluorinated side groups derived from a modifier. The modifier can comprise a perfluoro(alkyl vinyl ether). The perfluoro(alkyl vinyl ether) can comprise a perfluoro($C_{1-10}$alkyl vinyl ether), or a perfluoro($C_{1-5}$alkyl vinyl ether). The modifier can be present in an amount of less than or equal to 1 weight percent of the modified poly(tetrafluoroethylene) based on the total weight of the poly(tetrafluoroethylene). An example of a modified poly(tetrafluoroethylene) is DYNEON™ TFM commercially available from 3M™.

The sintered fluoropolymer can comprise a copolymer derived from at least two of tetrafluoroethylene, hexafluoropropylene, or vinylidene fluoride. For example, the sintered fluoropolymer can comprise a terpolymer derived tetrafluoroethylene, hexafluoropropylene, and vinylidene fluoride. An example of such a copolymer is DYNEON™ THV commercially available from 3M™.

The sintered fluoropolymer layer can comprise 95 to 100 volume percent, 99 to 100 volume percent, or 100 volume percent of the sintered fluoropolymer based on the total volume of the sintered fluoropolymer layer. The sintered fluoropolymer layer can optionally comprise a filler, for example, titanium dioxide to enhance the white color of the layer. Conversely, the sintered fluoropolymer layer can be free of a filler, for example, comprising 0 to 1 volume percent, or 0 volume percent of a filler based on the total volume of the layer.

The sintered fluoropolymer layer can be a solid layer. In other words, the sintered fluoropolymer layer can have a porosity of 0 volume percent. A low or zero porosity cap liner can be beneficial if the cap liner is being used for medical or pharmaceutical purposes, for example, to seal a pill bottle or a liquid medicine.

The backing layer can be a foam that can return to its original shape after being compressed. The foam can be open cell or closed cell. The foam can have a porosity of 10 to 70 volume percent, or 25 to 45 volume percent based on the total volume of the foam.

The foam can be a chemically blown foam or a physically blown foam. Examples of chemical blowing agents include sodium bicarbonate, sulfonyl hydrazides, dinitrosopentamethylenetetramine, azodicarbonamide, p-toluenesulfonyl semicarbazide, 5-phenyltetrazole, diisopropylhydrazodicarboxylate, 5-phenyl-3,6-dihydro-1,3,4-oxadiazin-2-one, or sodium borohydride. Examples of physical blowing agents include air, nitrogen, pentane, hexane, heptane, benzene, toluene, dichloromethane, trichloromethane, trichloroethylene, tetrachloromethane, 1,2-dichloroethane, trichlorofluoromethane, 1,1,2-trichlorotrifluoroethane, methanol, ethanol, 2-propanol, ethyl ether, isopropyl ether, acetone, methyl ethyl ketone, methylene chloride, isobutene, n-butane, or 1,1-difluoroethane.

The backing layer can comprise at least one of a polyacetal, a poly($C_{1-6}$ alkyl)acrylate, a poly(acrylic acid), a polyamide, a polyamideimide, a polyanhydride, a polyarylate, a poly(arylene ether), a poly(arylene sulfide), a polybenzoxazole, a polycarbonate, a polyester, a polyetheretherketone, a polyetherimide, a polyetherketoneketone, a polyetherketone, a polyethersulfone, a polyimide, a poly($C_{1-6}$ alkyl) methacrylate, a methacrylic polymer, a polyphthalide, a polyolefin, a polysilazane, a polysiloxane, a polystyrene, a polysulfide, a polysulfonamide, a polysulfonate, a polythioester, a polytriazine, a polyurea, a poly(vinyl alcohol), a poly(vinyl ester), a poly(vinyl ether), a poly(vinyl halide), a poly(vinyl ketone), a poly(vinylidene fluoride), a poly(vinyl ester), an epoxy, a phenolic polymer, a polyurethane, or a polysiloxane. The backing layer can comprise polyethylene, polyisobutylene, ethylene vinyl acetate, polypropylene, poly(vinyl chloride) (PVC), a polyurethane, polybutadiene, polyacrylonitrile, polystyrene, polyisobutylene, a polyacrylamide, or a polysiloxane. The backing layer can comprise an elastomer. The elastomer can comprise repeat units derived from at least one of butadiene, acrylonitrile, styrene, or isobutylene. The backing layer can comprise a polyolefin (optionally, at least one of polyethylene or polypropylene). When the backing layer comprises a polyolefin, the polyolefin can optionally comprise at least one of a fumaric acid graft or repeat units derived from at least one of a 1-alkene having 4 to 8 carbon atoms, a norbornene-type monomer, maleic anhydride, ethyl acrylate, isobutyl acrylate, or vinyl acetate. The backing layer can comprise polyethylene, for example, ultra-high molecular weight polyethylene, for example, having a weight average molecular weight of greater than or equal to 1 million Daltons, greater than or equal to 2 million Daltons based on polystyrene standards. The backing layer can comprise one or more of the aforementioned polymers.

The backing layer can comprise two or more layers. For example, the backing layer can comprise a foam layer and a solid outer layer located on a side of the foam layer opposite the sintered fluoropolymer layer. Alternatively, the backing layer can comprise a foam layer located in between opposing solid outer layers. The solid outer layer can comprise one or more of the aforementioned polymers of the backing layer and/or one or more of the aforementioned fluoropolymers. If present, a thickness of one or both of the outer layers can be 0.05 to 1 millimeter, or 0.05 to 0.5 millimeters.

A thickness of the sintered fluoropolymer layer can be or 0.02 to 0.4 millimeters, or 0.1 to 0.25 millimeters, 0.01 to 0.05 millimeters, or 0.01 to 0.03 millimeters. The sintered fluoropolymer layer can be a skived layer having a porosity of 0 volume percent and a thickness of 0.01 to 0.05 millimeters, or 0.01 to 0.03 millimeters. A thickness of the backing layer can be 0.5 to 3 millimeters, or 0.5 to 2 millimeters, or 0.7 to 1.5 millimeters. A ratio of the thickness of the backing layer to the sintered fluoropolymer layer can be 150:1 to 1.25:1, or 100:1 to 5:1, 20:1 to 10:1.

The cap liner can comprise a sintered fluoropolymer layer; and a backing layer; wherein the sintered fluoropolymer layer can be in direct physical contact with the backing layer with no intervening layer located there between. The sintered fluoropolymer layer can have a white color. The sintered fluoropolymer layer can comprise at least one of a poly(tetrafluoroethylene) or a modified poly(tetrafluoroethylene). The sintered fluoropolymer layer can be free of a filler. A thickness of the sintered fluoropolymer layer can be 0.02 to 0.4 millimeters. The backing layer can comprise a polyolefin. A thickness of the backing layer can be 0.5 to 3 millimeters. The backing layer can be a foam having a porosity of 10 to 70 volume percent based on the total volume of the backing layer and the sintered fluoropolymer layer can be free of a void space.

The sintered fluoropolymer layer can be formed by sintering a fluoropolymer layer at a temperature of 330 to 390° C., or 350 to 370° C. The sintering can last for greater than or equal to 5 minutes, or 5 to 30 minutes. The sintered fluoropolymer layer can be formed by sintering a plurality of fluoropolymer particles to form a bulk layer and skiving a surface of the bulk layer to form the sintered fluoropolymer layer. Two or more, or 2 to 10 skived layers can be stacked and laminated together to form the sintered fluoropolymer layer. The sintering can reduce or eliminate the porosity of the unsintered fluoropolymer layer thereby substantially reducing or preventing flow of gases or liquids there through.

The cap liner can be formed by plasma etching the sintered fluoropolymer layer to form a sintered plasma etched layer and laminating the sintered plasma etched layer and the backing layer to form the cap liner. The plasma etching can result in removal of exposed fluorine molecules thereby forming free radicals on the surface that can form bonds with the backing layer. The plasma etching can comprise etching with a plasma comprising at least one of hydrogen, oxygen, argon, ammonia, nitrogen, helium-oxygen, an inert gas, water vapor, a volatile non-polymerizing alcohol, or a non-polymerizing organic acid. The sintered plasma etched layer can be free of an etchant residue as identifiable using Fourier-transform infrared spectroscopy.

The laminating can comprise laminating at a temperature of 30 to 200° C., or 50 to 150° C., or 50 to 100° C. The laminating can comprise laminating at a pressure of 170 kilopascals to 25 megapascals, or 5 to 15 megapascals.

Figure 2:
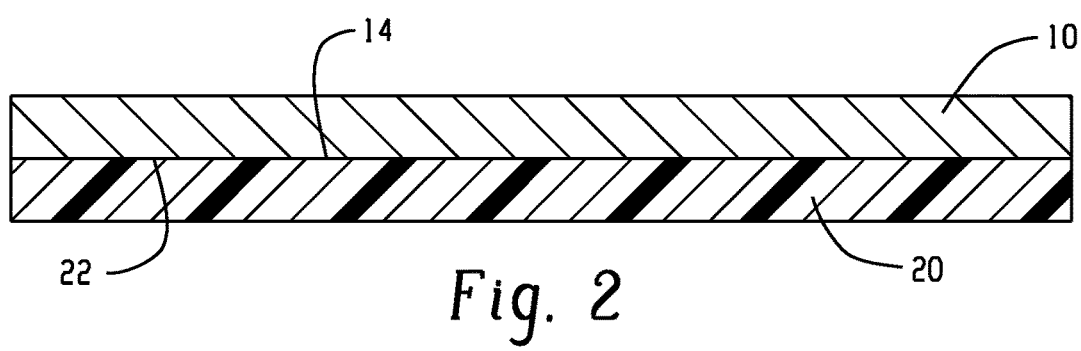
FIG. 2 is an illustration of an aspect of a cap liner.
Figure 3:
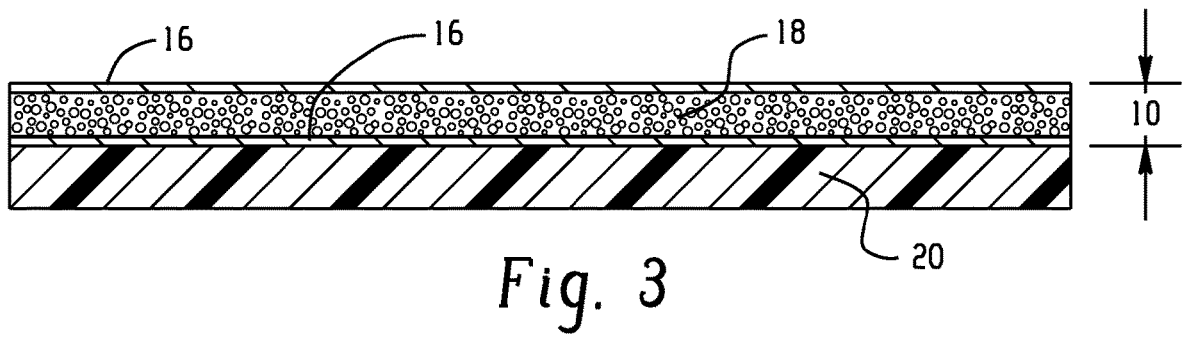
FIG. 3 is an illustration of an aspect of a cap liner.

FIG. 1 is an illustration of a capped container comprising a cap liner. The cap liner comprises a backing layer 10 and a sintered fluoropolymer layer 20. The backing layer 10 is cap-side and therefore proximal to the cap 2, whereas the sintered fluoropolymer layer 20 is container-side and therefore proximal to the container 4. FIG. 2 is an illustration of a cap liner comprising a backing layer 10 and a sintered fluoropolymer layer 20. FIG. 2 illustrates that an internal liner side 14 of the backing layer is in direct physical contact with an etched surface 22 of the fluoropolymer layer 20. FIG. 3 is also an illustration of a cap liner comprising a backing layer 10 and a sintered fluoropolymer layer 20. FIG. 3 illustrates that the backing layer 10 can comprise a foam layer 18 with solid outer liners 16 located on either side of the foam layer 18.

The cap liner can meet or exceed the Food and Drug Administration (FDA) one or more of the compliances for Olefin Polymers (21 CFR 177.1520), Closures with Sealing Gaskets for Food Container (21 CFR 177.1210), and Resinous and Polymeric Coatings (21 CFR 175.300). The cap liner can meet or exceed the FDA Drug Master File (DMF) 17137. The cap liner can meet or exceed the FDA Food Allergen Guidelines and California Proposition 65 Labeling Requirements. The cap liner can meet or exceed the European Compliances including Limitations of Heavy Metals in Packaging per CONEG and EU 94/62/EC/Article 11; including REACH and RoHS. The cap liner can meet or exceed the EU Regulation No. 10/2011 on plastic materials and articles intended to come into contact with food.

The following example is provided to illustrate the present disclosure. The example is merely illustrative and are not intended to limit devices made in accordance with the disclosure to the materials, conditions, or process parameters set forth therein.

EXAMPLE

Example 1: Formation of a Cap Liner

A sintered polytetrafluoroethylene layer was plasma etched to form a sintered plasma etched layer. The sintered polytetrafluoroethylene layer was analyzed before and after etching using Fourier transform infrared spectroscopy. The etchant gas was unable to be detected from the data indicating that there was no residual etchant gas on the surface. The sintered plasma etched layer was then laminated to a foam layer to form a cap liner exhibiting good adhesion between the two layers.

Set forth below are various non-limiting aspects of the disclosure.

Aspect 1: A cap liner, comprising: a sintered fluoropolymer layer; and a backing layer; wherein the sintered fluoropolymer layer is in direct physical contact with the backing layer with no intervening layer located there between.

Aspect 2: The cap liner of Aspect 1, wherein the sintered fluoropolymer layer has a white color.

Aspect 3: The cap liner of any of the preceding aspects, wherein the sintered fluoropolymer layer comprises at least one of poly(chlorotrifluoroethylene), poly(chlorotrifluoroethylene-propylene), poly(ethylene-tetrafluoroethylene), poly(ethylene-chlorotrifluoroethylene), poly(hexafluoropropylene), poly(tetrafluoroethylene), poly(tetrafluoroethylene-ethylene-propylene), poly(tetrafluoroethylene-hexafluoropropylene), poly(tetrafluoroethylene-propylene), poly(tetrafluoroethylene-perfluoropropylene vinyl ether), a perfluoroalkoxy polymer, polyvinylfluoride, poly(vinylidene fluoride), or poly(vinylidene fluoride-chlorotrifluoroethylene).

Aspect 4: The cap liner of any of the preceding aspects, wherein the sintered fluoropolymer layer comprises at least one of a poly(tetrafluoroethylene) or a modified poly(tetrafluoroethylene).

Aspect 5: The cap liner of any of the preceding aspects, wherein the sintered fluoropolymer layer comprises a copolymer derived from at least at least one of or at least two of tetrafluoroethylene, hexafluoropropylene, or vinylidene fluoride.

Aspect 6: The cap liner of any of the preceding aspects, wherein the sintered fluoropolymer layer is free of a filler.

Aspect 7: The cap liner of any of the preceding aspects, wherein a thickness of the sintered fluoropolymer layer is 0.02 to 0.4 millimeters, or 0.1 to 0.25 millimeters, 0.01 to 0.05 millimeters, or 0.01 to 0.03 millimeters.

Aspect 8: The cap liner of any of the preceding aspects, wherein the backing layer comprises an elastomer, wherein the elastomer optionally comprises repeat units derived from at least one of ethylene, butadiene, acrylonitrile, styrene, or isobutylene.

Aspect 9: The cap liner of any of the preceding aspects, wherein the backing layer comprises a foam.

Aspect 10: The cap liner of any of the preceding aspects, wherein the backing layer comprises two or more layers;

optionally, the backing layer comprises a foam layer and a solid outer layer located on a surface of the foam layer opposite the sintered fluoropolymer layer.

Aspect 11: The cap liner of any of the preceding aspects, wherein the backing layer comprises at least one of polyacetal, a poly($C_{1-6}$alkyl)acrylate, a polyacrylic, a polyamide, a polyamideimide, a polyanhydride, a polyarylate, a poly(arylene ether), a poly(arylene sulfide), a polybenzoxazole, a polycarbonate, a polyester, a polyetheretherketone, a polyetherimide, a polyetherketoneketone, a polyetherketone, a polyethersulfone, a polyimide, a poly($C_{1-6}$alkyl) methacrylate, a methacrylic polymer, a polyphthalide, a polyolefin, a polysilazane, a polysiloxane, a polystyrene, a polysulfide, a polysulfonamide, a polysulfonate, a polythioester, a polytriazine, a polyurea, a poly(vinyl alcohol), a poly(vinyl ester), a poly(vinyl ether), a poly(vinyl halide), a poly(vinyl ketone), a poly(vinylidene fluoride), a poly(vinyl ester), an epoxy, a phenolic polymer, or a polyurethane.

Aspect 12: The cap liner of any of the preceding aspects, wherein the backing layer comprises a polyolefin. The polyolefin can comprise at least one of polyethylene or polypropylene. The polyolefin can comprise a fumaric acid graft. The polyolefin can comprise repeat units derived from at least one of a 1-alkene having 4 to 8 carbon atoms, a norbornene-type monomer, maleic anhydride, ethyl acrylate, isobutyl acrylate, or vinyl acetate.

Aspect 13: The cap liner of any of the preceding aspects, wherein the backing layer comprises a high molecular weight polyethylene.

Aspect 14: The cap liner of any of the preceding aspects, wherein a thickness of the backing layer is 0.5 to 3 millimeters, or 0.5 to 2 millimeters, or 0.7 to 1.5 millimeters.

Aspect 15: The cap liner of any of the preceding aspects, wherein the backing layer has a porosity of 10 to 70 volume percent, or 25 to 45 volume percent based on the total volume of the backing layer.

Aspect 16: A method of forming the cap liner, for example, of any of the preceding aspects, comprising: plasma etching the sintered fluoropolymer layer to form a sintered plasma etched layer; and laminating the sintered plasma etched layer and the backing layer to form the cap liner.

Aspect 17: The method of Aspect 16, further comprising sintering a fluoropolymer layer to form the sintered fluoropolymer layer at a temperature of 330 to 390° C. for greater than or equal to 5 minutes, or 5 to 30 minutes.

Aspect 18: The method of any of Aspects 16 to 17, wherein the plasma etching comprises etching with a plasma comprising at least one of hydrogen, oxygen, nitrogen, helium-oxygen, an inert gas, water vapor, a volatile non-polymerizing alcohol, or a non-polymerizing organic acid.

Aspect 19: The method of any of Aspects 16 to 18, wherein the sintered plasma etched layer is free of an etchant residue identifiable by Fourier transform infrared spectroscopy.

Aspect 20: The method of any of Aspects 16 to 19, wherein the laminating comprises laminating 30 to 200° C., or 50 to 150° C., or 50 to 100° C. and/or a pressure of 170 kilopascals to 25 megapascals, or 5 to 15 megapascals.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

As used herein, "a," "an," "the," and "at least one" do not denote a limitation of quantity, and are intended to cover both the singular and plural, unless the context clearly indicates otherwise. For example, "an element" has the same meaning as "at least one element," unless the context clearly indicates otherwise. The term "combination" is inclusive of blends, mixtures, alloys, reaction products, and the like. Also, "at least one of" means that the list is inclusive of each element individually, as well as combinations of two or more elements of the list, and combinations of at least one element of the list with like elements not named.

The term "or" means "and/or" unless clearly indicated otherwise by context. Reference throughout the specification to "an aspect," "another aspect," "some aspects," and so forth, means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects. The endpoints of all ranges directed to the same component or property are inclusive of the endpoints, are independently combinable, and include all intermediate points and ranges. For example, ranges of "up to 25 vol %, or 5 to 20 vol %" is inclusive of the endpoints and all intermediate values of the ranges of "5 to 25 vol %," such as 10 to 23 vol %, etc.).

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this invention belongs.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:
1. A cap liner, comprising:
   a solid sintered plasma etched fluoropolymer layer having a porosity of 0 volume percent based on the total volume of the solid sintered plasma etched fluoropolymer layer; wherein the sintered plasma etched fluo- ropolymer layer comprises at least one of a poly(tetrafluoroethylene) or a modified poly(tetrafluoroethylene); and
a backing layer in the form of a continuous compressible foam layer having a porosity of 10 to 70 volume percent based on the total volume of the backing layer; wherein the sintered plasma etched fluoropolymer layer is in direct physical contact with the backing layer with no intervening layer located there between; wherein the sintered plasma etched fluoropolymer layer is co-extensive with the backing layer; and
wherein the cap liner is configured to provide continuous contact between the backing layer and an inner surface of a cap.

2. The cap liner of claim 1, wherein the sintered plasma etched fluoropolymer layer has a white color.

3. The cap liner of claim 1, wherein the sintered plasma etched fluoropolymer layer comprises a copolymer derived from tetrafluoroethylene and at least one of hexafluoropropylene or vinylidene fluoride.

4. The cap liner of claim 1, wherein the sintered plasma etched fluoropolymer layer is free of a filler.

5. The cap liner of claim 1, wherein a thickness of the sintered plasma etched fluoropolymer layer is 0.02 to 0.4 millimeters.

6. The cap liner of claim 1, wherein the continuous compressible foam layer comprises at least one of polyacetal, a poly($C_{1-6}$ alkyl)acrylate, a polyacrylic, a polyimide, a polyamideimide, a polyanhydride, a polyarylate, a poly(arylene ether), a poly(arylene sulfide), a polybenzoxazole, a polycarbonate, a polyester, a polyetheretherketone, a polyetherimide, a polyetherketoneketone, a polyetherketone, a polyethersulfone, a polyimide, a poly($C_{1-6}$ alkyl)methacrylate, a methacrylic polymer, a polyphthalide, a polyolefin, a polysilazane, a polysiloxane, a polystyrene, a polysulfide, a polysulfonamide, a polysulfonate, a polythioester, a polytriazine, a polyurea, a poly(vinyl alcohol), a poly(vinyl ester), a poly(vinyl ether), a poly(vinyl halide), a poly(vinyl ketone), a poly(vinylidene fluoride), a poly(vinyl ester), an epoxy, a phenolic polymer, or a polyurethane.

7. The cap liner of claim 1, wherein the continuous compressible foam layer comprises an elastomer.

8. The cap liner of claim 7, wherein the elastomer comprises repeat units derived from at least one of ethylene, butadiene, acrylonitrile, styrene, or isobutylene.

9. The cap liner of claim 1, wherein the continuous compressible foam layer comprises a polyolefin.

10. The cap liner of claim 9, wherein the polyolefin comprises a fumaric acid graft and/or repeat units derived from at least one of a 1-alkene having 4 to 8 carbon atoms, a norbornene monomer, maleic anhydride, ethyl acrylate, isobutyl acrylate, or vinyl acetate.

11. The cap liner of claim 1, wherein the backing layer comprises the continuous compressible foam layer having a porosity of 25 to 45 volume percent based on the total volume of the backing layer.

12. The cap liner of claim 1, wherein the backing layer further comprises a solid outer layer located on a surface of the continuous compressible foam layer opposite the solid sintered plasma etched fluoropolymer layer.

13. The cap liner of claim 1, wherein a thickness of the backing layer is 0.5 to 3 millimeters.

14. The cap liner of claim 1, wherein the solid sintered plasma etched fluoropolymer layer is free of an etchant residue identifiable by Fourier transform infrared spectroscopy.

15. The cap liner of claim 1, wherein the continuous compressible foam layer is a closed cell compressible continuous foam layer.

16. The cap liner of claim 1, wherein the continuous compressible foam layer has a porosity of 25 to 45 volume percent based on the total volume of the backing layer.

17. A method of forming the cap liner of claim 1, the method comprising:
plasma etching a sintered fluoropolymer layer to form the solid sintered plasma etched fluoropolymer layer; and
laminating the sintered plasma etched layer and the backing layer to form the cap liner.

18. A cap liner, comprising:
a solid sintered plasma etched fluoropolymer layer having a porosity of 0 volume percent based on the total volume of the solid sintered plasma etched fluoropolymer layer; wherein the sintered plasma etched fluoropolymer layer comprises at least one of a poly(tetrafluoroethylene) or a modified poly(tetrafluoroethylene); wherein the sintered plasma etched fluoropolymer layer is free of a filler; and
a backing layer in the form of a continuous compressible foam layer having a porosity of 25 to 45 volume percent based on the total volume of the backing layer; wherein the continuous compressible foam layer comprises at least one of an elastomer or a polyolefin; and
wherein the sintered plasma etched fluoropolymer layer is in direct physical contact with the backing layer with no intervening layer located there between; wherein the sintered plasma etched fluoropolymer layer is co-extensive with the backing layer;
wherein the sintered plasma etched fluoropolymer layer is free of an etchant residue identifiable by Fourier transform infrared spectroscopy; and
wherein the cap liner is configured to provide continuous contact between the backing layer and an inner surface of a cap.

* * * * *